US012586743B2

(12) United States Patent
Hofsaess

(10) Patent No.: US 12,586,743 B2
(45) Date of Patent: Mar. 24, 2026

(54) TEMPERATURE-DEPENDENT SWITCH

(71) Applicant: Marcel P. Hofsaess, Steintahleben (DE)

(72) Inventor: Marcel P. Hofsaess, Steintahleben (DE)

( * ) Notice: Subject to any disclaimer, the term of this patent is extended or adjusted under 35 U.S.C. 154(b) by 61 days.

(21) Appl. No.: 18/389,879

(22) Filed: Dec. 20, 2023

(65) Prior Publication Data

US 2024/0212960 A1 Jun. 27, 2024

(30) Foreign Application Priority Data

Dec. 21, 2022 (DE) ..................... 10 2022 134 379.0

(51) Int. Cl.
*H01H 37/04* (2006.01)
*H01H 37/34* (2006.01)
*H01H 37/54* (2006.01)

(52) U.S. Cl.
CPC ............ *H01H 37/04* (2013.01); *H01H 37/34* (2013.01); *H01H 37/5427* (2013.01)

(58) Field of Classification Search
CPC .... H01H 37/04; H01H 37/34; H01H 37/5427; H01H 2037/5454; H01H 2037/5463;
(Continued)

(56) References Cited

U.S. PATENT DOCUMENTS 5,721,525 A 2/1998 Hofsaess
5,757,261 A 5/1998 Becher et al.
(Continued)

FOREIGN PATENT DOCUMENTS

CN 113871249 A * 12/2021
DE 19507105 C1 * 5/1996 ........... H01C 1/1406
(Continued)

OTHER PUBLICATIONS

Hofsaes Geb Zeitz Ulrika, "Temperature monitor with excess temp. electrical switch", May 15, 1996, Entire Document (Translation of DE 19507105). (Year: 1996).*
(Continued)

*Primary Examiner* — Stephen S Sul
(74) *Attorney, Agent, or Firm* — Reising Ethington P.C.

(57) ABSTRACT

A temperature-dependent switch having a switch housing, a temperature-dependent switching mechanism and a heating resistor component. The switch housing comprises a lower part made of electrically conductive material and a lid part which comprises a first section made of electrically conductive material and a second section made of electrically insulating material. The temperature-dependent switching mechanism comprises a movable contact part that establishes a first electrical connection between the lower part and a stationary contact part below a response temperature and interrupts the first electrical connection upon exceeding the response temperature. The heating resistor component is arranged inside the switch housing between the lid part and the lower part. The heating resistor component is electrically connected in series with the lower part and the first section of the lid part and electrically in parallel with the first electrical connection. The heating resistor component is arranged at a distance from the stationary contact part.

14 Claims, 8 Drawing Sheets

(58) Field of Classification Search
CPC ........ H01H 1/504; H01H 37/32; H01H 37/02; H01H 37/52
See application file for complete search history.

(56) References Cited

U.S. PATENT DOCUMENTS

| | | | | | |
|---|---|---|---|---|---|
| 5,892,429 | A | 4/1999 | Hofsaess | | |
| 6,031,447 | A * | 2/2000 | Hofsass | H01H 37/5427 | 337/365 |
| 6,191,680 | B1 * | 2/2001 | Hofsass | H01H 37/002 | 337/365 |
| 6,210,824 | B1 * | 4/2001 | Sullivan | H01M 50/578 | 429/61 |
| 10,580,600 | B2 * | 3/2020 | Ullermann | H01H 37/5409 | |
| 2003/0085791 | A1 * | 5/2003 | Ramahi | H01H 11/06 | 337/380 |
| 2015/0035641 | A1 * | 2/2015 | Mochizuki | H01H 71/025 | 29/622 |
| 2015/0109092 | A1 * | 4/2015 | Neumann | H01H 37/54 | 337/365 |

FOREIGN PATENT DOCUMENTS

| | | | |
|---|---|---|---|
| DE | 19604939 | A1 | 8/1997 |
| DE | 102013102006 | A1 | 8/2014 |
| DE | 102015110509 | A1 | 1/2017 |
| EP | 0740323 | A2 | 10/1996 |
| EP | 0756302 | B1 | 3/2002 |

OTHER PUBLICATIONS

Liang Anming, “Thermal protector using PTC as base”, Dec. 31, 2021, Foshan Eagle Tech Co Ltd, Entire Document (Translation of CN 113871249). (Year: 2021).*

* cited by examiner

TEMPERATURE-DEPENDENT SWITCH

CROSS-REFERENCE TO RELATED APPLICATIONS

This application claims priority from German patent application DE 10 2022 134 379.0, filed on Dec. 21, 2022. The entire content of this priority application is incorporated herein by reference.

FIELD

This disclosure relates to a temperature-dependent switch.

BACKGROUND

An exemplary temperature-dependent switch is disclosed in DE 10 2013 102 006 A1.

Such temperature-dependent switches are used in a principally known manner to monitor the temperature of a device. For this purpose, the switch is brought into thermal contact with the device to be protected, e.g. via one of its outer surfaces, so that the temperature of the device to be protected influences the temperature of the switching mechanism arranged inside the switch.

The switch is typically connected electrically in series into the supply circuit of the device to be protected via connecting leads, so that below the response temperature of the switch, the supply current of the device to be protected flows through the switch.

The switch disclosed in DE 10 2013 102 006 A1 comprises a switch housing in the interior of which a switching mechanism is arranged in a hermetically sealed manner. The switch housing is constructed in two parts. It comprises a lower part made of electrically conductive material and a lid part made of an insulating material or a PTC material. The lid part is inserted into the lower part and is held by a bent upper edge of the lower part. The switching mechanism is clamped between the lid part and the lower part. During manufacture of the switch, the switching mechanism is first inserted loosely into the lower part. The lid part is then placed on top and firmly connected to the lower part.

The temperature-dependent switching mechanism arranged in the switch housing comprises a bimetal snap-action disc that is fixed to a movable contact part. This bimetal snap-action disc is responsible for the temperature-dependent switching behavior of the switch. At low temperatures, it ensures that the switching mechanism establishes an electrically conductive connection between the movable contact part of the switching mechanism and a stationary contact part arranged on the lid part, which stationary contact part acts as a counter-contact to the movable contact part. At higher temperatures, on the other hand, the bimetal snap-action disc interrupts this electrical contact by ensuring that the moving contact part is lifted off the stationary contact part.

The terms “low temperature position” and “high temperature position” are used in the present document. The term “low-temperature position” refers to the position of the switch as long as the switch or the switching mechanism has a temperature below the response temperature. In this low-temperature position, the switch is closed so that current can flow through the switch via the switching mechanism, as the movable contact part of the switching mechanism is in mechanical contact with the stationary contact part. The term “high-temperature position” refers to the position of the switch that it assumes when the temperature of the switch or the switching mechanism exceeds the response temperature. In this high-temperature position, the switch is open, which means that the current flow is interrupted by the switching mechanism, as the movable contact part of the switching mechanism is lifted off or spaced apart from the stationary contact part.

The bimetal snap-action disc is usually configured as a multilayer, active, sheet-metal component composed of two, three or four interconnected components with different thermal expansion coefficients. In such bimetal snap-action discs, the individual layers of metals or metal alloys are usually joined by material bonding or positive locking, for example by rolling.

Such a bimetal snap-action disc has a first stable geometric configuration (low-temperature configuration) at low temperatures, below the response temperature, and a second stable geometric configuration (high-temperature configuration) at high temperatures, above the response temperature. The bimetal snap-action disc snaps from its low-temperature configuration to its high-temperature configuration in a temperature-dependent manner in the manner of a hysteresis. This process is often referred to as “snapping”, which also explains the name “snap-action disc”.

Unless a reset lock is provided, the bimetal snap-action disc snaps back to its low-temperature configuration so that the switch is closed again as soon as the temperature of the bimetal snap-action disc drops below the so-called reset temperature of the bimetal snap-action disc due to the cooling of the device to be protected.

Depending on the application, however, such a switch-back can be undesirable. For safety reasons, for example, it can be necessary for the switch to be configured in such a way that it does not automatically close again after the switch has been opened due to temperature when the device to be protected cools down again. For example, the switch should only close again after the device to be protected has not only cooled down, but has also been completely disconnected from the power supply.

A so-called self-holding (latching) function was developed for such cases. In the switch disclosed DE 10 2013 102 006 A1, this self-holding function is achieved by the fact that the lid part of the switch is made of a PTC material (positive temperature coefficient thermistor or PTC thermistor).

As long as the switch is in its low-temperature position and closed, no current flows through the PTC material connected as a parallel resistor. However, when the switch opens, a small self-holding current flows through the parallel resistor, which heats it up and ensures that the switch remains at a temperature above the response temperature of the bimetal snap-action disc. The self-holding current is so low that the electrical device to be protected suffers no further damage, so that it can cool down. The self-holding resistance caused by the PTC element prevents the switch itself from cooling down again and thus switching on again, which would perform an iterative switching on and off of the electrical device to be protected without the parallel resistor. The PTC element thus acts as a heating resistor, which heats up the switch even after the switch has opened due to temperature, as long as the device to be protected is energized, and thus continues to keep the switch open.

The switch disclosed in DE 10 2013 102 006 A1 comprises a manufacturing-related disadvantage. This disadvantage is due to the fact that the bimetal snap-action disc including the movable contact part is inserted into the switch housing as a loose individual part. Only by closing the switch housing, the bimetal snap-action disc is then fixed in position and its position relative to the other components of the switching mechanism is determined. However, the assembly of such a switch, in which the bimetal snap-action disc is inserted individually, has proven to be relatively cumbersome, as several steps are necessary to insert the switching mechanism into the switch housing.

In addition, the storage of the switching mechanism or the individual parts of the switching mechanism is cumbersome. Bulk storage of the individual parts of the switching mechanism, for example, is hardly an option, since these individual parts, in particular the bimetal snap-action disc, are relatively susceptible to damage. If such damage occurs during storage, a resulting malfunction of the switching mechanism is usually detected only when the switch is assembled, as it is almost impossible to test the function of the switching mechanism beforehand.

Furthermore, it has been found that the design of the lid part of the switch made of PTC material can be disadvantageous. PTC material is a comparatively brittle material, so that the switch design proposed in DE 10 2013 102 006 A1 can lead to minor cracks in the lid part or even to breakage of the lid part. This is critical in particular if the stationary contact part is formed as a rivet that penetrates the lid part made of PTC material. The rivet can then cause additional material stress on the cover made of PTC material.

A further temperature-dependent switch with a self-holding function is disclosed in EP 0 756 302 B1. Here, a heating resistor component made of PTC material, formed as a ring part, is inserted loosely into the interior of the switch housing. The problems mentioned above in connection with material stress on the relatively brittle PTC material therefore no longer occur here. However, the structure of the switch known from EP 0 756 302 B1 is much more complex with significantly more components in total.

A temperature-dependent switch with a self-holding function is also disclosed in EP 0 740 323 A2. In this switch, the self-holding function is achieved by a heating resistor integrated into a foil. This foil is clamped between the lid part and the lower part of the switch. A part of the foil protrudes outwards from the switch housing. A disadvantage of this solution is the multiple function that the foil has to fulfill. The foil not only performs the self-holding function, but also serves to electrically insulate the lid part from the lower part of the switch and furthermore provides a mechanical seal between the lid part and the lower part to prevent impurities from entering the inside of the switch.

SUMMARY

It is an object to provide a temperature-dependent switch with a self-holding function that is easier to produce, has a more stable design and is better sealed. Among other things, it would be desirable that the switch is comparatively easy to install, comprises a low overall height and is designed to be pressure-resistant.

According to an aspect, a temperature-dependent switch is presented comprising the following components:

- a switch housing comprising a lower part made of electrically conductive material and a lid part which closes the lower part and comprises a first section made of electrically conductive material, on which a stationary contact part is arranged, and a second section made of electrically insulating material which is permanently connected to the first section and via which the lid part is in contact with the lower part;
- a temperature-dependent switching mechanism comprising a movable contact part and being configured to establish a first electrical connection between the lower part and the stationary contact part below a response temperature of the switching mechanism by pressing the movable contact part against the stationary contact part and thus holding the switch in a closed position, and to interrupt the first electrical connection upon exceeding the response temperature by lifting the movable contact part off the stationary contact part and bringing the switch in an open position; and
- a heating resistor component arranged completely inside the switch housing between the lid part and the lower part and enclosed by the switch housing, wherein the heating resistor component is electrically connected in series with the lower part and the first section of the lid part and electrically in parallel with the first electrical connection, and wherein the heating resistor component is arranged at a distance from the stationary contact part.

The herein presented switch is thus easy to install, pressure-resistant and made up of comparatively few components.

Compared to the switch disclosed in DE 10 2013 102 006 A1, the heating resistor component does not form the lid part and is not penetrated by a rivet. The heating resistor component is therefore less susceptible to breakage and is better protected inside the switch housing.

Compared to the switch disclosed in EP 0 756 302 B1, the lid part comprises a first section made of electrically conductive material, on which the stationary contact part is arranged, and a second section made of electrically insulating material, which is permanently connected to the first section. An extra insulating sleeve, as proposed in EP 0 756 302 B1, to insulate the lid part from the lower part and seal the interface between the lid part and the lower part is therefore not necessary. The switch can therefore be designed with comparatively few components and thus have a simpler structure. This simplifies the assembly and improves the sealing of the switch housing.

Compared to the switch disclosed in EP 0 740 323 A2, in particular the sealing of the switch housing is improved and a more pressure-stable switch design is achieved, as the heating resistor component is arranged completely inside the switch housing between the lid part and the lower part.

The above-mentioned object is thus completely solved.

According to a refinement, the heating resistor component is a ring part on which the lid part rests and through whose ring opening the movable contact part presses against the stationary contact part in order to establish the first electrical connection between the lower part and the stationary contact part in the closed position of the switch.

The ring part is very easy to insert into the switch during switch assembly and can be slipped with its ring opening over the movable contact part of the switching mechanism. The electrical connection between the individual parts is established by the support alone and by closing the lower part by means of the lid part. Switch assembly is therefore extremely simple.

The ring part is preferably circular and its ring opening is cylindrical. However, this does not necessarily have to be the case. In principle, the ring part can also be oval or angular with a closed contour.

In a further refinement, the heating resistor component is clamped between the lid part and the lower part.

This measure is also advantageous in terms of construction and assembly, as the heating resistor component can be inserted loosely into the switch housing during assembly and is then automatically fixed in position when the switch is closed and is then held securely.

In a further refinement, the heating resistor component is in direct contact with the lid part and the lower part, respectively.

This avoids the need for further intermediate components. This helps achieve optimum electrical contacting of the heating resistor component and at the same time ensures a very compact, low-profile design of the switch.

In a further refinement, the heating resistor component comprises a PTC material. According to this refinement, the heating resistor component is particularly preferably made of PTC material. The heating resistor component composed of PTC material is preferably a solid device, which increases the pressure stability of the switch.

According to an alternative refinement, the heating resistor component comprises a plastic material having conductor tracks arranged thereon.

The heating resistor component can be a heating foil, for example. The carrier material of such a foil comprises Teflon, Kapton or Nomex, for example. The conductor tracks arranged thereon can be embedded in the carrier material. They serve as a heating resistor.

Preferably, the heating resistor component according to this refinement is provided with conductive tracks on one side. The conductor tracks can, for example, be circular in shape and arranged on the top side of the heating resistor component facing the lid part or on the bottom side of the heating resistor component facing the lower part.

In a further refinement, the temperature-dependent switching mechanism comprises a switching mechanism unit, which comprises the movable contact part and a bimetal snap-action disc coupled with the movable contact part, and a switching mechanism housing, in which the switching mechanism unit is arranged and held captive therein, wherein the switching mechanism housing is arranged in the switch housing.

Such an extra switching mechanism housing may have various advantages. The switching mechanism housing makes it possible to prefabricate the switching mechanism as a semi-finished product before it is inserted into the switch housing together with the switching mechanism housing. The switching mechanism prefabricated as a semi-finished product can be stored as bulk material. During this bulk storage, the switching mechanism unit is protected by the switching mechanism housing. Damage to the switching mechanism unit during bulk storage is largely excluded, as the various components of the switching mechanism unit are securely encapsulated in the switching mechanism housing.

During manufacture of the temperature-dependent switch, the switching mechanism and its switching mechanism housing can be prefabricated as a semi-finished product and then inserted into the switch housing as a whole. This not only simplifies the storage of the switching mechanism, but also the manufacture of the temperature-dependent switch many times over.

In a further refinement, the bimetal snap-action disc is configured to snap over from a geometrically stable low-temperature configuration to a geometrically stable high-temperature configuration upon exceeding the response temperature, and wherein the bimetal snap-action disc in its high-temperature configuration is supported on a first support surface), which is arranged on an inner side of the switching mechanism housing facing the switching mechanism unit, thereby keeping the movable contact part at a distance from the stationary contact part.

This helps ensure that the switching mechanism, together with its switching mechanism housing, is fully functional even without a switch housing. In its high-temperature configuration, the bimetal snap-action disc can be supported on the switching mechanism housing itself so that the movable contact part, which is coupled with the bimetal snap-action disc, can move within the switching mechanism housing when the bimetal snap-action disc snaps over. A functional check of the switching mechanism can therefore easily be carried out before the switching mechanism is installed in the switch.

The two mentioned configurations of the bimetal snap-action disc refer to different geometric positions of the bimetal snap-action disc. In the low-temperature configuration or the low-temperature position, the bimetal snap-action disc is preferably convexly curved on its upper side. In the high-temperature configuration or the high-temperature position, the bimetal snap-action disc is preferably concavely curved on its upper side.

In a further refinement, the switching mechanism unit furthermore comprises a snap-action spring disc which is coupled with the movable contact part and which is, below the response temperature, supported on a second support surface arranged on an inner side of the switching mechanism housing facing the switching mechanism unit and thereby presses the movable contact part against the stationary contact part.

The additional provision of such a snap-action spring disc has the advantage, in particular, that it relieves the load on the bimetal snap-action disc. In the low-temperature position of the switch, i.e. when the circuit across the switch is closed, the snap-action spring disc serves as a current-carrying component according to this refinement. The bimetal snap-action disc, on the other hand, is then not a current-carrying component.

In addition, in the low-temperature position of the switch, the snap-action spring disc generates the closing pressure with which the movable contact part is pressed against the stationary contact part. In contrast, the bimetal snap-action disc can be stored almost force-free in the low-temperature position of the switch. This has a positive effect on the service life of the bimetal snap-action disc and means that the switching point, i.e. the response temperature of the bimetal snap-action disc, does not change even after many switching cycles.

Since the snap-action spring disc can be supported on the second support surface provided on the inner side of the switching mechanism housing, the switching mechanism and its switching mechanism housing can also be used in a fully functional manner without the switch housing.

In a further refinement, the switching mechanism housing comprises a base body which surrounds the switching mechanism unit from a first housing side, a second housing side opposite the first housing side and a housing circumference side extending between and transversely to the first and second housing sides and has an opening on the first housing side, through which the movable contact part presses against the stationary contact part in order to establish the first electrical connection between the lower part and the stationary contact part below the response temperature.

Unlike a conventional switch housing, the additionally provided switching mechanism housing is not a closed housing in which the switching mechanism is hermetically sealed, but a partially open housing comprising a first opening on the first side of the housing through which the contact part is accessible from outside the switch housing and through which the movable contact part presses against the stationary contact part in the low-temperature position of the switch.

The base body of the switching mechanism housing at least partially surrounds the switching mechanism unit from all six spatial directions. As a result, the switching mechanism unit is captively held in the switching mechanism housing. As long as the switching mechanism unit is not inserted into the switching mechanism housing, a certain amount of play is preferably present between the switching mechanism unit and the switching mechanism housing, but even then the switching mechanism unit cannot fall out of the switching mechanism housing.

In a further refinement, the base body of the switching mechanism housing is formed in one piece.

The base body of the switching mechanism housing therefore preferably consists of a single piece from which all housing sides are integrally formed. This reduces the total number of parts and therefore the costs. At the same time, this contributes to a very pressure-stable design of the switching mechanism. This is advantageous not only during storage of the switching mechanism as a bulk material, but also in the ultimately installed state in which the switching mechanism is installed in the temperature-dependent switch.

In a further refinement, the base body of the switching mechanism housing comprises an electrically conductive material. Preferably, the base body of the switching mechanism housing is made of an electrically conductive material. This electrically conductive material is particularly preferably a metal.

This embodiment enables the switch housing to be inserted as the current-carrying device of the temperature-dependent switch.

In a further refinement, the switching mechanism housing is arranged in the lower part and the heating resistor component rests on the switching mechanism housing.

According to this refinement, the switching mechanism housing not only serves to protect the switching mechanism unit, but also serves as a current-carrying device and as a mechanical carrier for the heating resistor component. This ensures a simple design with as few components as possible and increases the mechanical stability of the switch.

In a further refinement, the switching mechanism housing is rotationally symmetrical about a central axis. The switching mechanism located therein is preferably also rotationally symmetrical about the central axis.

This simplifies the installation of the switching mechanism together with its switching mechanism housing in a switch housing of the temperature-dependent switch, since the switching mechanism can be inserted into the temperature-dependent switch in various positions rotated around the central axis. In addition, the rotationally symmetrical design of the switching mechanism housing enables an equally distributed force distribution in all directions (radial directions).

The bimetal snap-action disc and the snap-action spring disc are preferably each circular disc-shaped. Furthermore, the bimetal snap-action disc and the snap-action spring disc are preferably each bistable.

“Bistable” in this respect means that both snap-action discs each have two different, stable geometric configurations/positions, wherein the two stable configurations/positions of the bimetal snap-action disc are temperature-dependent and the two stable configurations/positions of the snap-action spring disc are temperature-independent. This has the effect that the two snap-action discs remain stable in their respective positions after they have snapped over from one configuration to the other, without any undesired snapping back. Thus, the switching mechanism only snaps over upon exceeding the response temperature of the bimetal snap-action disc is exceeded and when the return temperature of the bimetal snap-action disc is undershot. The snap-action spring disc then snaps over together with the bimetal snap-action disc into its respective other configuration/position.

In a further refinement, the second section of the lid part is formed as a plastic ring surrounding the first section of the lid part.

Preferably, the first section of the lid part according to this refinement is formed as a plate-shaped body to which the plastic ring is attached all around. The plastic ring is preferably connected to the first section of the lid part in a material-locking manner. Particularly preferably, the first section of the lid part is made of a metallic body, the edge of which is molded around the circumference with the plastic ring.

An extra insulating foil can therefore be omitted. This in turn can increase the tightness of the switch housing enormously. It also simplifies the installation of the switch.

In a further refinement, the stationary contact part is formed as a rivet that penetrates the lid part and captively connects the first section of the lid part with the second section of the lid part.

The rivet pierces both the first and the second section of the lid part and thus holds both sections captive to each other. According to this refinement, the two sections of the lid part are preferably plate-shaped and arranged one above the other. The second section forms the outside of the lid part, while the first section is arranged on the inside of the lid part facing the switching mechanism.

Particularly preferably, the second section according to the latter refinement comprises a recess in which the first section is arranged.

It is understood that the above features and those yet to be explained below can be used not only in the configuration indicated in each case, but also in other combinations or on their own, without departing from the spirit and scope of the present disclosure.

and

Figure 8:
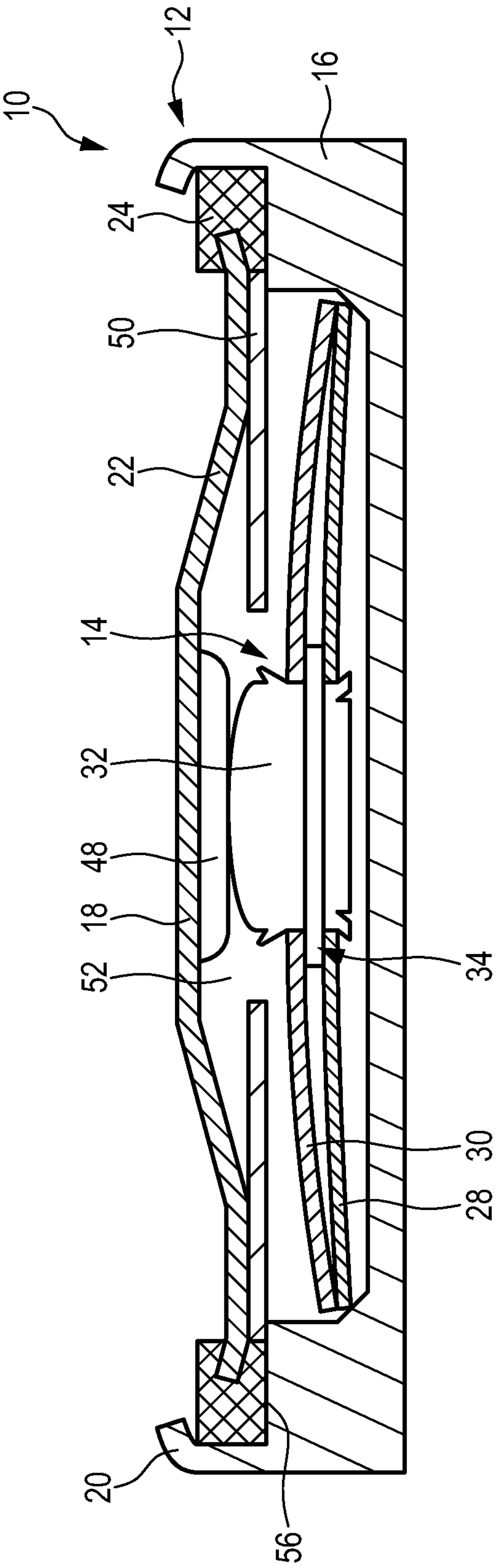

FIG. 8 is a schematic sectional view of a sixth embodiment of the temperature-dependent switch, wherein the switch is in its low-temperature position.

DESCRIPTION OF PREFERRED EMBODIMENTS

Figure 1:
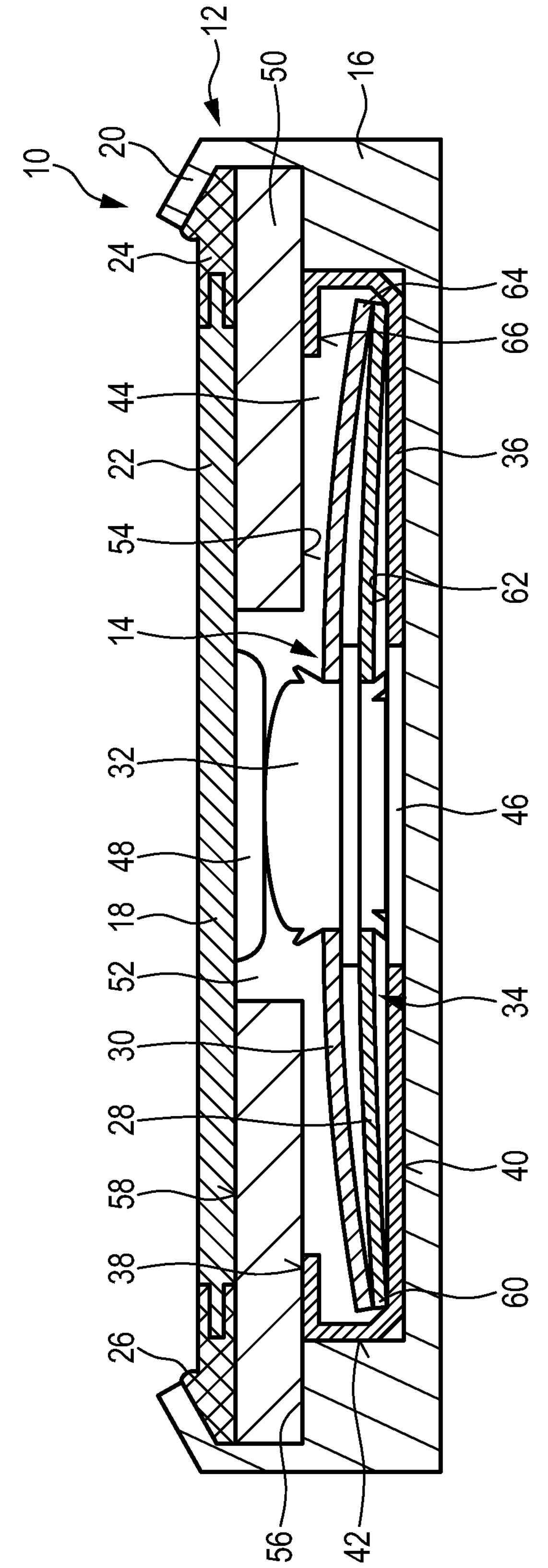
FIG. 1 is a schematic sectional view of a first embodiment of the temperature-dependent switch, wherein the switch is in its low-temperature position.
Figure 2:
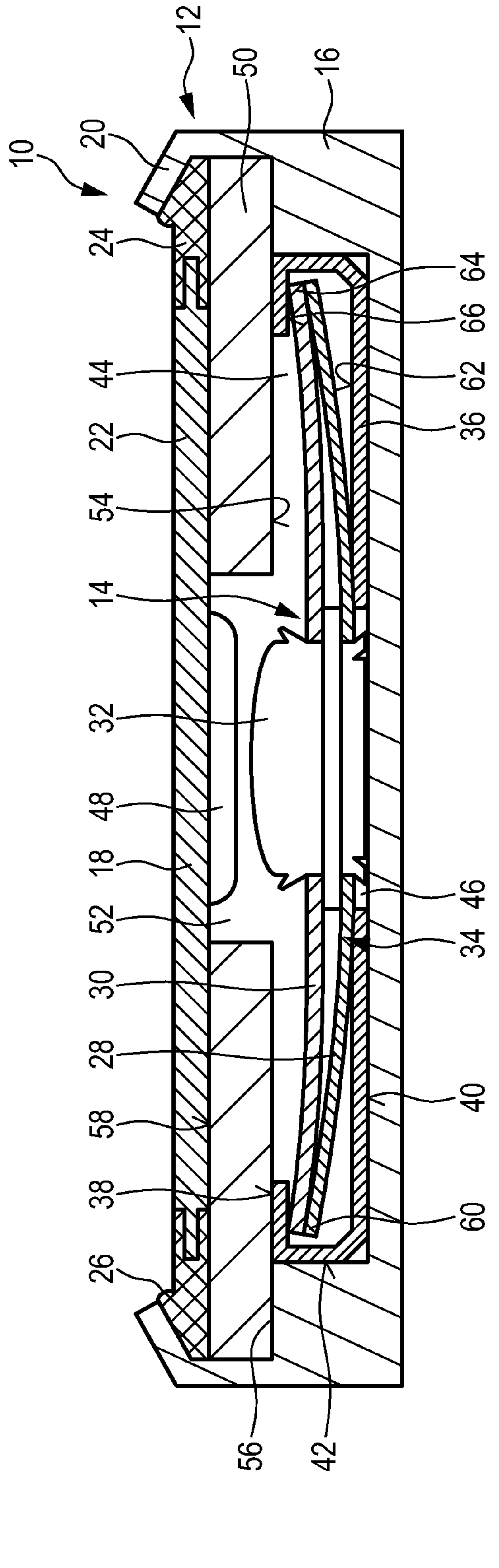
FIG. 2 is a schematic sectional view of the first embodiment of the temperature-dependent switch shown in FIG. 1, wherein the switch is in its high-temperature position.

FIGS. 1 and 2 show a first embodiment of the switch, each in a schematic sectional view. The switch is denoted in its entirety by reference numeral 10. FIG. 1 shows the low-temperature position of the switch 10, i.e. the position in which the switch 10 is closed. FIG. 2 shows the high-temperature position of the switch 10, i.e. the position in which the switch 10 is open.

The switch 10 comprises a switch housing 12 in which a temperature-dependent switching mechanism 14 is arranged. The switch housing 12 comprises a pot-like lower part 16 and a lid part 18, which is held on the lower part 16 by a bent or flanged edge 20.

The lower part 16 is made of electrically conductive material, preferably metal. The lid part 18 comprises two different sections 22, 24 which are fixedly connected to each other. The first section 22 is made of electrically conductive material, preferably metal. The second section 24 is made of electrically insulating material, preferably plastic.

In this embodiment, the second section 24 preferably surrounds the first section 22 along the entire circumference of the lid part 18. The second section 24 thus forms the interface via which the lid part 18 is in contact with the lower part 16. The section 24 thus ensures that the two parts 16, 18 of the switch housing 12 are electrically insulated from each other. Furthermore, the second section 24 of the lid part 18 ensures that the interior of the switch housing 12 is sealed. For further sealing of the interior of the switch, additional sealing means can be provided, which are not shown here for the sake of simplicity. For example, the connection point between the lid part 18 and the lower part can be additionally sealed with sealant. It is also possible for the top side of the switch housing 12 or the entire switch housing to be provided with a resin cover, for example made of epoxy. This not only improves the sealing effect and prevents liquids or impurities from entering the inside of the housing from the outside, but also increases the pressure stability of the switch 10.

In the first embodiment of the switch 10 shown in FIGS. 1 and 2, the second section 24 of the lid part 18 is formed as a plastic ring which is arranged around the first section 22 of the lid part 18. During manufacture of the lid part 18, the first section 22 is molded with plastic compound for this purpose. This is preferably done by hot or injection molding and ensures an extremely stable and material-tight connection between the two sections 22, 24 of the lid part 18. To further improve the seal, it is furthermore preferred if a circumferential sealing bead 26 is created on the outer edge on the top side of the second section 24 during manufacture.

Since the lower part 16 and the first section 22 of the lid part 18 are made of electrically conductive material, thermal contact to an electrical device to be protected can be established via the respective outer surfaces of the lower part 16 or the first section 22 of the lid part 18. These outer surfaces are also used for the electrical external connection of the switch 10.

The switching mechanism 14 comprises a temperature-independent snap-action spring disc 28 and a temperature-dependent bimetal snap-action disc 30. The snap-action spring disc 28 is preferably designed as a bistable spring disc. This snap-action spring disc 28 has two temperature-independent stable geometric configurations. The first configuration is shown in FIG. 1. The temperature-dependent bimetal snap-action disc 30 comprises two temperature-dependent configurations, a geometric high-temperature configuration and a geometric low-temperature configuration. In the low-temperature position of the switching mechanism 14 shown in FIG. 1, the bimetal snap-action disc 30 is in its geometric low-temperature configuration.

The bimetal snap-action disc 28 and the snap-action spring disc 30 are held captive on a contact part 32. This contact part 32 is referred to as movable contact part 32 in the present case, as it can be moved together with the bimetal snap-action disc 28 and the snap-action spring disc 30. The three aforementioned movable components 28, 30, 32 of the switching mechanism 14 together form a switching mechanism unit 34, which is movable within a switching mechanism housing 36.

The switching mechanism unit 34 is held captive in the switching mechanism housing 36. The switching mechanism unit 34 can therefore not unintentionally detach from the switching mechanism housing 36. The switching mechanism housing 36 comprises a base body which is formed in one piece and at least partially surrounds the switching mechanism unit 34 from all six spatial directions. The base body of the switching mechanism housing 36 is made of electrically conductive material, preferably metal.

The switching mechanism housing 36 or the base body forming the switching mechanism housing 36 is designed as a partially open housing, so that the switching mechanism unit 34 is accessible from at least one spatial direction, preferably from two spatial directions, from outside the switching mechanism housing 36.

Due to the fact that the switching mechanism housing 36 at least partially surrounds the switching mechanism unit 34 from all six spatial directions, the switching mechanism unit 34 is held captive in the switching mechanism housing 36. As long as the switching mechanism 14 is not inserted into a temperature-dependent switch, a certain amount of play is preferably present between the switching mechanism unit 34 and the switching mechanism housing 36. At least in the low-temperature position of the switching mechanism 14, the switching mechanism unit 34 is movable within the switching mechanism housing 36 as long as the switching mechanism 14 is not inserted into a switch.

The switching mechanism unit 34 can be prefabricated as a semi-finished product and then inserted as a whole into the switching mechanism housing 36. The switching mechanism 14 together with the switching mechanism unit 34 and the switching mechanism housing 36 then also form a semi-finished product.

Since both the three components 28, 30, 32 of the switching mechanism unit 14 are captively connected to one another and the switching mechanism unit 14 is captively held in the switching mechanism housing 36, the switching mechanism 14 can be stored as bulk material until it is installed in the switch housing 12 of the temperature-dependent switch 10. It should be noted, however, that the components 28, 30, 32 of the switching mechanism unit 14 themselves do not necessarily have to be captively connected to one another, as this connection function is already ensured by the switching mechanism housing 36. The bimetal snap-action disc 30 and the snap-action spring disc

28 can therefore also be loosely attached to the contact part 32 as long as the three components 28, 30, 32 are held together by the switching mechanism housing 36.

The switching mechanism housing 36 protects the fragile components of the switching mechanism unit 34, i.e. in particular the bimetal snap-action disc 30 and the snap-action spring disc 28, from damage during bulk storage. The insertion of the switching mechanism unit 34 into such a switching mechanism housing 36 also has the advantage that the switching mechanism 14 can be inserted into the switch housing 12 of the switch 10 as a switching mechanism inlay in a very simple way. Due to this very simple handling of the switching mechanism 14, the assembly process of the temperature-dependent switch 10 can be automated without further ado.

The one-piece base body forming the switching mechanism housing 36 surrounds the switching mechanism unit 34 from a first housing side 38, a second housing side 40 opposite the first housing side 38 and a housing circumferential side 42 extending between and transversely to the first and second housing sides 38, 40, in each case at least partially. Preferably, the switching mechanism housing 36 completely surrounds the switching mechanism unit 34 from the housing circumferential side 42. The housing circumferential side 42 thus preferably forms a closed housing side of the switching mechanism housing 36. The first housing side 38 and the second housing side 40 are each partially open housing sides of the switching mechanism housing 36. In other words, the housing circumferential side 42 surrounds the switching mechanism unit 34 along the entire circumference, i.e. from a total of four spatial directions aligned orthogonally to one another. Furthermore, the switching mechanism housing 36 only partially surrounds the switching mechanism unit 34 from the two remaining spatial directions, which are orthogonal to the four spatial directions mentioned.

On the first housing side 38, the base body of the switching mechanism housing 36 comprises a first opening 44 through which the movable contact part 32 is accessible from outside the switching mechanism housing 36. On the second housing side 40, the base body of the switching mechanism housing 36 comprises a second opening 46, through which the contact part 32 is also accessible from outside the switching mechanism housing 36.

In the low-temperature position of the switch 10 shown in FIG. 1, the movable contact part 32 permanently protrudes through the first opening 44 and interacts with a stationary contact part 48 arranged on the inner side of the lid part 18, more precisely arranged on the inner side of the first section 22 of the lid part 18.

The second opening 46 is required in particular when the switching mechanism unit 14 is in its high-temperature position (see FIG. 2). This second opening 46 then offers the possibility of greater freedom of movement of the switching mechanism unit 14 within the switching mechanism housing 36, since the movable contact part 32 can in this position of the switching mechanism 14 then project out of the switching mechanism housing 36 through the second opening 46 or at least partially project into the second opening 46.

In addition to the switching mechanism 14, a heating resistor component 50 is arranged in the switch housing 12 of the switch 10. Similar to the switching mechanism 14, the heating resistor component 50 is arranged completely inside the switch housing 12 and is enclosed by it.

The heating resistor component 50 is responsible for the self-holding function of the switch 10. It is electrically connected in series with the lower part 16 and the first section 22 of the lid part 18 and electrically in parallel with the electrical connection between the lower part 16 and the first section 22, which is effected in the low-temperature position via the switching mechanism 14.

The heating resistor component 50 is formed as a ring part, which in the first embodiment shown in FIGS. 1 and 2 is made of PTC or PTC thermistor material. The heating resistor component 50 formed as a ring part comprises a central ring opening 52, through which the movable contact part 32 interacts with the stationary contact part. This central ring opening 52 is large enough to create a distance between the stationary contact part 48 and the heating resistor component 50. The heating resistor component 50 is thus spaced apart from the stationary contact part 48.

The heating resistor component 50 is in direct mechanical contact with the lower part 16 and the lid part 18 of the switch housing 12. It is clamped between the lower part 16 and the lid part 18. With its bottom side 54 facing the switching mechanism 14, the heating resistor component 50 rests on the switching mechanism housing 36 and on a circumferential shoulder 56 provided on the inner side of the lower part 16. The lid part 18 rests directly on the top side 58 of the heating resistor component 50, wherein the lid part is pressed onto the circumferential shoulder 56 together with the heating resistor component 50 due to the bent edge 20.

In the following, the operation of the switch 10 is explained in more detail with reference to FIGS. 1 and 2.

In the position shown in FIG. 1, the switch 10 is in its low-temperature position, in which the temperature-independent spring disc 28 is in its first configuration and the temperature-dependent bimetal disc 30 is in its low-temperature configuration. The spring disc 28 thereby presses the movable contact part 32 against the first stationary contact part 48. The spring disc 28 is thereby supported with its outer edge 60 on a support surface 62 (presently referred to as "second support surface"), which is configured on an inner side of the switching mechanism housing 36 facing the switching mechanism unit 34.

In the closed low-temperature position of the switch 10 according to FIG. 1, an electrically conductive connection is thus established between the lower part 16 and the first stationary contact part 48 via the switching mechanism 14. The contact pressure between the movable contact part 32 and the first stationary contact part 48 is generated by the temperature-independent spring disc 28. The temperature-dependent bimetallic disc 30, on the other hand, is virtually force-free in this state.

If the temperature of the device to be protected and thus the temperature of the switch 10 and the bimetal disc 30 arranged therein now increases to the response or switching temperature or above this response temperature, the bimetal disc 30 snaps from its convex low-temperature configuration shown in FIG. 1 to its concave high-temperature configuration shown in FIG. 2. During this snapping movement, the bimetal disc 30 is supported with its outer edge 64 on a support surface 66 (referred to as "first support surface" in the present case), which is configured on an inner side of the switching mechanism housing 36 facing the switching mechanism unit 34. With its center, the bimetal disc 30 thereby pulls the movable contact part 32 downwards and lifts the movable contact part 32 off the first stationary contact part 48. This simultaneously causes the spring disc 28 to bend downwards at its center, so that the spring disc 28 snaps from its first stable geometric configuration shown in FIG. 1 into its second geometrically stable configuration shown in FIG. 2.

FIG. 2 shows the high-temperature position of the switch 10, in which it is open. The electrically conductive connection between the lower part 16 of the switch housing 12 and the stationary contact part 48, which is made via the switching mechanism 14 in the low-temperature position of the switch 10, is interrupted in the high-temperature position of the switch 10 shown in FIG. 2. The lower part 16 of the switch housing 12 is then electrically connected to the stationary contact part 48 "only" via the heating resistor component 50.

In the high-temperature position of the switch 10, the heating resistor component 50 made of PTC material already has a relatively high electrical resistance due to the high temperature. Thus, only a small residual current can flow through the switch 10 via the heating resistor component 50. This residual current is harmless for the device to be protected. However, the residual current causes the PTC material to heat up, which heats up the entire switch 10. This also keeps the bimetal disc 30 at a temperature above its response temperature so that the switch 10 is no longer closed via the switching mechanism 14.

Only when the device to be protected is de-energized, i.e. when no more current flows through the switch 10, the heating resistor component 50 and thus the switch 10 cool down. As soon as the switching mechanism 14 then reaches a temperature below the response temperature of the bimetal disc 30, the bimetal disc 30 then snaps back from its high-temperature configuration shown in FIG. 2 to its low-temperature configuration shown in FIG. 1, whereby the switch 10 is closed again.

FIGS. 3-8 show further embodiments. Since the basic structure of the switch 10 and the operating mode are similar to the switch 10 shown in FIG. 1, only the differences are explained in the following. Similarly, "only" the low-temperature position of the switch 10 is shown for each embodiment.

Figure 3:
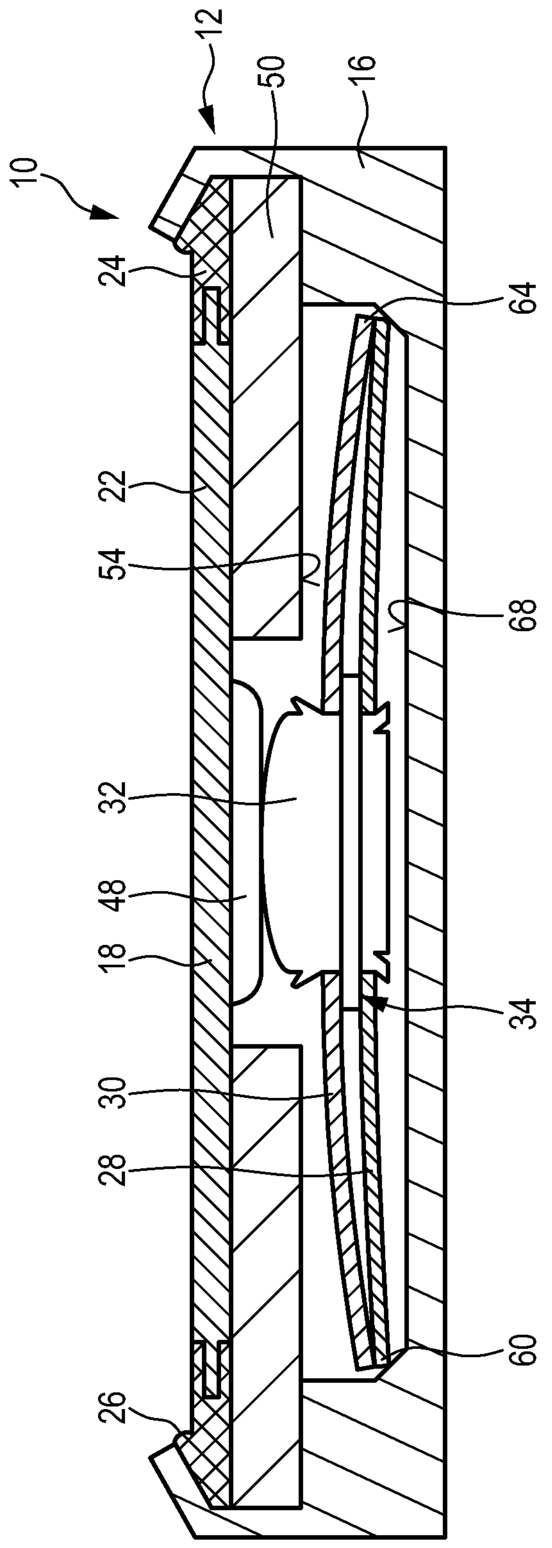
FIG. 3 is a schematic sectional view of a second embodiment of the temperature-dependent switch, wherein the switch is in its low-temperature position.

The second embodiment of the switch 10 shown in FIG. 3 is the same as the first embodiment shown in FIGS. 1 and 2, except for the fact that the switching mechanism housing 36 of the switching mechanism 14 has been omitted. As a result, the advantages mentioned for the first embodiment with the switching mechanism 14 encapsulated as a switching mechanism inlay in the switching mechanism housing 36 are omitted, but the switch 10 is still fully functional. The self-holding function effected by the heating resistor component 50 is also retained in the same way.

In the low-temperature position of the switch 10 shown in FIG. 3, the spring disc 28 is supported with its outer edge 60 directly on the inner base 68 on the inside of the lower housing part 16. In the high-temperature position, the outer edge 64 of the bimetal disc 30 is supported on the bottom side 54 of the heating resistor component 50.

Figure 4:
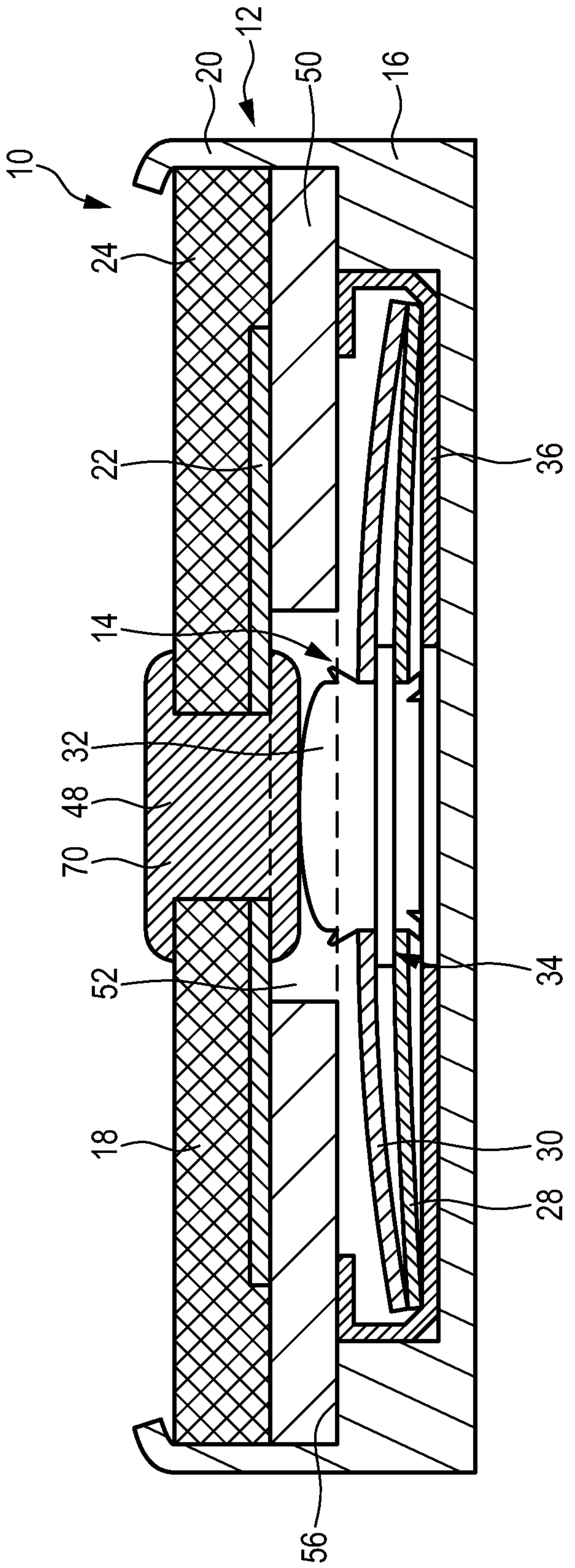
FIG. 4 is a schematic sectional view of a third embodiment of the temperature-dependent switch, wherein the switch is in its low-temperature position.

In the third embodiment of the switch 10 shown in FIG. 4, the structure of the lid part 18 is substantially modified compared to the embodiment shown in FIGS. 1 and 2. Here, the lid part 18 is largely made of plastic. The second section 24 of the lid part 18, which is made of plastic, forms this majority of the lid part 18. The first section 22 is configured to be comparatively smaller and is again made of metal. The first section 22 is preferably a thin metal sheet arranged in a corresponding recess in the first section 24.

In the center of the lid part 18, both sections 22, 24 are captively connected to each other via the stationary contact part 48. The stationary contact part 48 is formed as a rivet 70, which penetrates the lid part 18 and connects the two sections 22, 24 of the lid part to one another.

Figure 5:
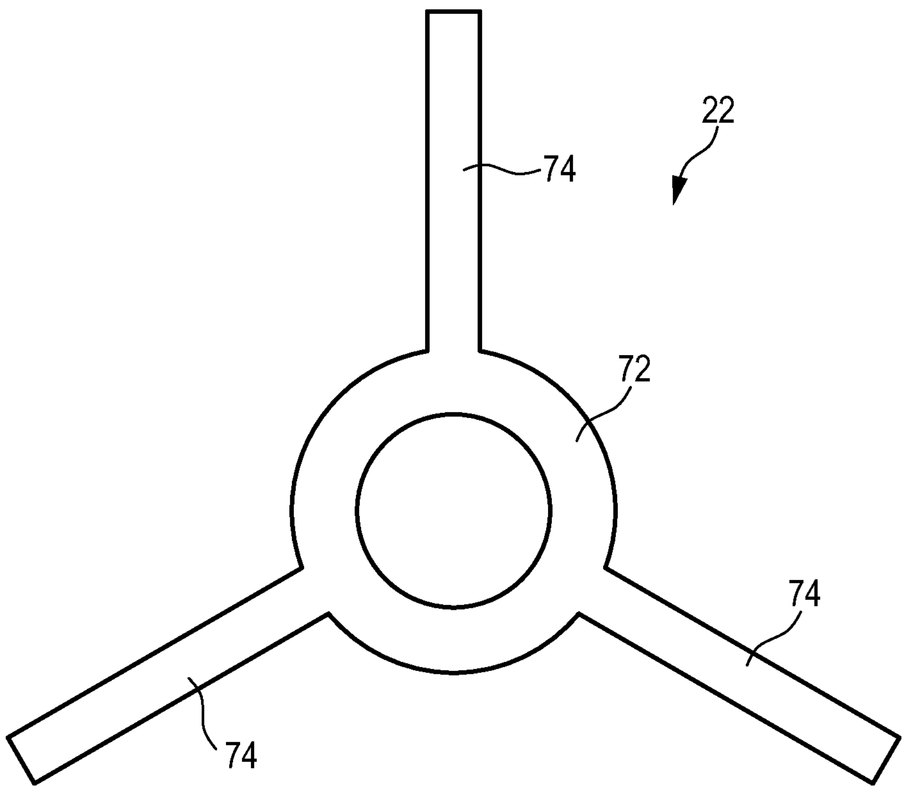
FIG. 5 is a schematic top view of a first cover section used in the switch shown in FIG. 4.

FIG. 5 schematically shows a possible configuration of the first section 22 of the lid part 18 in a plan view from above. As already mentioned, the first lid part section 22 is formed as a metal sheet. The metal sheet comprises a centrally arranged, annular element 72 and three webs 74 branching off from it in the radial direction. The annular element 72 is used for contacting the first section 22 with the stationary contact part 48, which is formed as a rivet. The three webs 74 are used for contacting with the heating resistor component 50 to ensure the self-holding function.

It is understood that the first section 22 of the lid part according to this embodiment could in principle also be plate-shaped or circular disc-shaped, but the shape shown in FIG. 5 has the advantage of avoiding eddy currents and also ensures a space-saving and compact arrangement of the first section 22.

Figure 6:
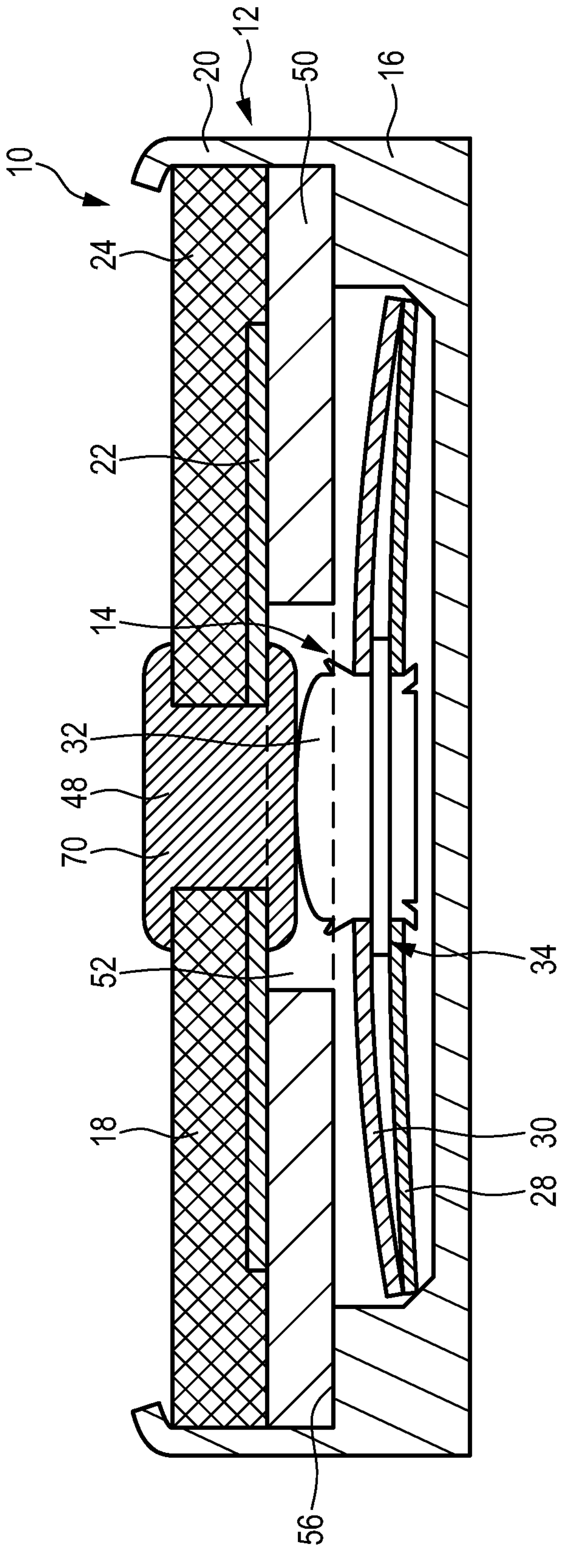
FIG. 6 is a schematic sectional view of a fourth embodiment of the temperature-dependent switch, wherein the switch is in its low-temperature position.

Similarly, as the third embodiment shown in FIG. 3 corresponds to the first embodiment shown in FIGS. 1 and 2 only without switching mechanism housing 36, the fourth embodiment shown in FIG. 6 corresponds to the third embodiment shown in FIG. 4 only without switching mechanism housing 36.

Figure 7:
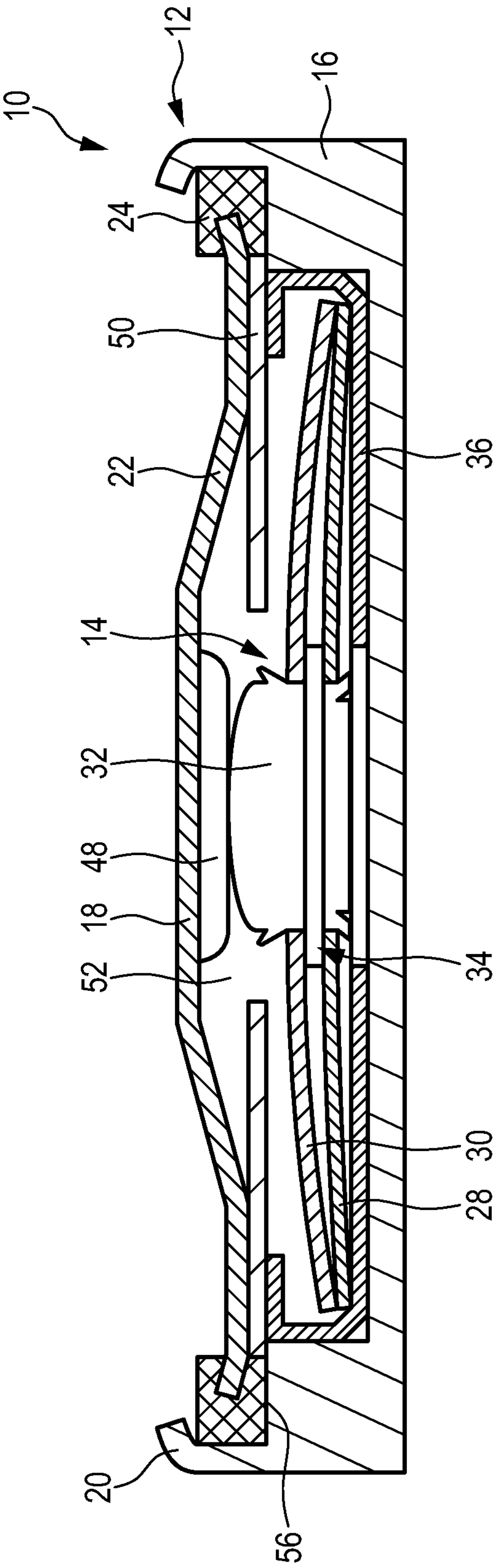
FIG. 7 is a schematic sectional view of a fifth embodiment of the temperature-dependent switch, wherein the switch is in its low-temperature position.

FIGS. 7 and 8 show a fifth and sixth embodiment of the switch 10. These two embodiments also differ from one another in that the switching mechanism 14 according to FIG. 7 is configured as a switching mechanism inlay with switching mechanism housing 36, while according to FIG. 8 it is inserted directly into the lower part 16 of the switch housing.

The two embodiments shown in FIGS. 7 and 8 differ from the embodiments shown in FIGS. 1-6 by the following features: The lid part 18 has a similar structure to the first embodiment shown in FIGS. 1 and 2. It comprises a first section 22 made of metal, which is surrounded by a second section 24 made of plastic. The second section 24 is an insulating ring made of plastic, which is arranged around the first section 22 and connected to it in a fixed manner. The flanged upper edge 22 is also bent onto the second section 24 and can be hot-stamped with the second section 24 to increase the tightness.

The heating resistor component 50 is much thinner here, namely a heating foil made of a plastic material with conductor tracks arranged on it. The heating foil can be made of Teflon, Kapton or Nomex, for example. The desired heating power of the heating resistor component 50 can be defined correspondingly via the resistance of the conductor tracks to ensure the self-holding function.

Overall, the heating resistor component 50 formed as a heating foil results in a significantly flatter and more compact design of the switch 10. In addition, the heating foil has an increased material load capacity compared to the PTC material and is less sensitive to breakage.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A temperature-dependent switch, comprising:

a switch housing having a lower part that comprises an electrically conductive material, and a lid part that closes the lower part and comprises a first section and a second section fixed to the first section, the first section comprising an electrically conductive material, on which a stationary contact part is arranged, and the second section comprising an electrically insulating material and being in contact with the lower part;

a temperature-dependent switching mechanism comprising a movable contact part and being configured to switch, upon exceeding a response temperature, from a closed position, in which the temperature-dependent switching mechanism establishes a first electrical connection between the lower part and the stationary contact part by pressing the movable contact part against the stationary contact part, to an open position, in which the temperature-dependent switching mechanism interrupts the first electrical connection by lifting the movable contact part off the stationary contact part; and a heating resistor component arranged inside the switch housing between the lid part and the lower part and being enclosed by the switch housing, wherein the heating resistor component is electrically connected in series with the lower part and the first section of the lid part and electrically in parallel with the first electrical connection, and wherein the heating resistor component is arranged at a distance from the stationary contact part;

wherein the heating resistor component rests with its bottom side facing the temperature-dependent switching mechanism on a circumferential shoulder, and wherein the first section and the second section of the lid part rest on and are in direct contact with a planar top side of the heating resistor component opposite the bottom side.

2. The temperature-dependent switch according to claim 1, wherein the heating resistor component comprises a ring part on which the lid part rests, the ring part comprising a ring opening through which the movable contact part presses against the stationary contact part in order to establish the first electrical connection between the lower part and the stationary contact part in the closed position.

3. The temperature-dependent switch according to claim 1, wherein the heating resistor component is clamped between the lid part and the lower part.

4. The temperature-dependent switch according to claim 1, wherein the heating resistor component is in direct contact with the lid part and the lower part, respectively.

5. The temperature-dependent switch according to claim 1, wherein the heating resistor component comprises a PTC material.

6. The temperature-dependent switch according to claim 1, wherein the temperature-dependent switching mechanism comprises a switching mechanism unit, which comprises the movable contact part and a bimetal snap-action disc coupled with the movable contact part, and a switching mechanism housing, in which the switching mechanism unit is arranged and held captively, wherein the switching mechanism housing is arranged in the switch housing.

7. The temperature-dependent switch according to claim 6, wherein the bimetal snap-action disc is configured to snap from a low-temperature configuration into a high-temperature configuration upon exceeding the response temperature, and wherein the bimetal snap-action disc in its high-temperature configuration is supported on a first support surface, which is arranged on an inner side of the switching mechanism housing facing the switching mechanism unit.

8. The temperature-dependent switch according to claim 6, wherein the switching mechanism unit further comprises a snap-action spring disc which is coupled to the movable contact part and which is, in the closed position, supported on a second support surface arranged on an inner side of the switching mechanism housing facing the switching mechanism unit.

9. The temperature-dependent switch according to claim 6, wherein the switching mechanism housing comprises a base body which surrounds the switching mechanism unit from a first housing side, a second housing side opposite the first housing side and a housing circumferential side extending between and transversely to the first and second housing sides, wherein the base body has an opening on the first housing side, through which the movable contact part presses against the stationary contact part in order to establish the first electrical connection between the lower part and the stationary contact part in the closed position.

10. The temperature-dependent switch according to claim 9, wherein the base body of the switching mechanism housing is formed in one piece.

11. The temperature-dependent switch according to claim 9, wherein the base body of the switching mechanism housing comprises an electrically conductive material.

12. The temperature-dependent switch according to claim 6, wherein the switching mechanism housing is arranged in the lower part and the heating resistor component rests on the switching mechanism housing.

13. The temperature-dependent switch according to claim 1, wherein the second section of the lid part is formed as a plastic ring surrounding the first section of the lid part.

14. The temperature-dependent switch according to claim 1, wherein the stationary contact part comprises a rivet that penetrates the lid part and captively connects the first section of the lid part with the second section of the lid part.

* * * * *